United States Patent

Park

Patent Number: 5,250,481
Date of Patent: Oct. 5, 1993

[54] HIGH DIELECTRIC CERAMIC COMPOSITION

[75] Inventor: Sung Y. Park, Seoul, Rep. of Korea

[73] Assignee: Samsung Electro-Mechanics Co., Ltd., Suwon, Rep. of Korea

[21] Appl. No.: 950,165

[22] Filed: Sep. 24, 1992

[30] Foreign Application Priority Data

Dec. 28, 1991 [KR] Rep. of Korea ............ 24911

[51] Int. Cl.$^5$ .............................. C04B 35/46
[52] U.S. Cl. ....................................... 501/138
[58] Field of Search ............................ 501/138

[56] References Cited

U.S. PATENT DOCUMENTS

| | | | |
|---|---|---|---|
| 4,861,736 | 8/1989 | Ono et al. | 501/138 |
| 4,882,305 | 11/1989 | Chu et al. | 501/138 |
| 4,939,108 | 7/1990 | Dean | 501/137 |

FOREIGN PATENT DOCUMENTS

| | | |
|---|---|---|
| 0205137 | 12/1986 | European Pat. Off. |
| 0256405 | 2/1988 | European Pat. Off. |
| 58-15078 | 1/1983 | Japan . |
| 59-94302 | 5/1984 | Japan . |
| 60-57163 | 12/1985 | Japan . |
| 61-99207 | 5/1986 | Japan . |
| 2229603 | 10/1987 | Japan . |
| 2229605 | 10/1987 | Japan . |
| 3102105 | 5/1988 | Japan . |
| 3-045557 | 2/1991 | Japan . |

*Primary Examiner*—Mark L. Bell
*Assistant Examiner*—Deborah Jones
*Attorney, Agent, or Firm*—Cushman, Darby & Cushman

[57] ABSTRACT

A high dielectric ceramic composition essentially consisting of 97.04 weight % to 97.80 weight % of $BaTiO_3$ as a host material, 1.42 weight % to 1.92 weight % of $Nb_2O_5$, 0.04 weight % to 0.06 weight % of $MnO_2$, 0.33 weight % to 0.45 weight % of CoO, 0.31 weight % to 0.41 weight % of $CeO_2$ and 0.10 weight % to 0.12 weight % of ZnO. The composition exhibits TCC characteristic satisfying the characteristic of X7R of EIA standard, high dielectric constant of 3,200 to 3,800 and high insulation resistivity of $10^3$ to $10^{14}$. With these characteristics, the composition is useful for making multi-layer ceramic capacitors, thereby contributing to a compactness of electronic/electric appliances.

1 Claim, No Drawings

HIGH DIELECTRIC CERAMIC COMPOSITION

BACKGROUND OF THE INVENTION

1. Field of the Invention

The present invention relates to ceramic compositions for multi-layer ceramic capacitors, and more particularly to ceramic compositions having a high dielectric constant making it possible to produce miniature multi-layer ceramic capacitors.

2. Description of the Prior Art

High dielectric ceramic compositions with barium titanate ($BaTiO_3$) as main component have been used in making multi-layer ceramic capacitors. Conventionally, many proposals have been made which involve addition of various additives for improving unsatisfactory characteristics. However, they have a difficulty in determining the effect of one additive or the effects of several additives on the overall characteristics by varying the amount of one additive or simultaneously varying the amounts of several additives. As a result, it is difficult to obtain a composition capable of exhibiting desired stable dielectric constant and insulation resistivity and to find optimum amounts of additives making it possible to achieve the same characteristics.

There have been also proposed dielectric compositions capable of satisfying the characteristic of X7R of EIA (Electric Industries Association) standard. The X7R characteristic means that the change rate of dielectric constant measured at a temperature range of $-55°$ C. to $+125°$ C., taking $25°$ C. as reference is not more than $\pm15\%$. The dielectric compositions are barium titanate-niobium oxide ($BaTiO_3$-$Nb_2O_5$) based compositions including additives. Japanese Patent Publication No. 61-99207 discloses a high dielectric ceramic composition including MgO and $CeO_2$ as additives. Japanese Patent Publication No. 62-229605 discloses the use of $Co_2O_3$, $MnO_2$ and $CeO_2$ as additives. On the other hand, Japanese Patent Publication No. 60-19606 discloses a high dielectric ceramic composition including CaO and ZnO as additives. Although exhibiting high dielectric constant of 3,000 or above, however, these compositions disclosed in the publications show high loss factor (tan $\delta$) of not more than 0.8% measured at a frequency of 1 KHz and low insulation resistivity of $10^{11}$. They also show unstable temperature dependant capacitance change rate (TCC) which varies irregularly depending on variation in composition.

SUMMARY OF THE INVENTION

Therefore, the present invention has been made in view of the above-mentioned prior art problem and an object of the invention is to provide a high dielectric ceramic composition for a multi-layer ceramic capacitor, capable of exhibiting improved characteristics, namely, high dielectric constant and superior insulation resistivity so that the formed multi-layer ceramic capacitor is miniature enough to be located on a circuit substrate.

In accordance with the present invention, this object is accomplished by providing a ceramic composition having a high dielectric constant, said ceramic composition essentially consisting of 97.04 weight % to 97.80 weight % of $BaTiO_3$ as a host material, 1.42 weight % to 1.92 weight % of $Nb_2O_5$, 0.04 weight % to 0.06 weight % of $MnO_2$, 0.33 weight % to 0.45 weight % of CoO, 0.31 weight % to 0.41 weight % of $CeO_2$ and 0.10 weight % to 0.12 weight % of ZnO, the ceramic composition satisfying the characteristic of X7R of Electric Industries Association standard.

DETAILED DESCRIPTION OF THE INVENTION

For producing a ceramic composition having a high dielectric constant, first, an additive mixture is prepared in accordance with the present invention. The preparation of the additive mixture is achieved by mixing 1.42 weight % to 1.92 weight % of $Nb_2O_5$, 0.04 weight % to 0.06 weight % of $MnO_2$, 0.33 weight % to 0.45 weight % of CoO, 0.31 weight % to 0.41 weight % of $CeO_2$ and 0.10 weight % to 0.12 weight % of ZnO together, milling the resultant mixture, and drying the milled mixture at a temperature of about $100°$ C. The prepared additive mixture is then mixed with 97.04 weight % to 97.80 weight % of $BaTiO_3$ as a host material. The resultant mixture is molded under pressure to have a proper shape such as a disc. The disc sample is sintered at given temperature following with Ag electroding on its both faces. When 24 hours elapsed, dielectric properties of the sample were measured.

The product made from the high dielectric ceramic composition according to the present invention not only satisfies the characteristic of X7R of EIA standard, but also exhibits a high dielectric constant of 3,200 to 3,800 and a high insulation resistivity of $10^{13}$ to $10^{14}$. These characteristics means that the high dielectric ceramic composition of the present invention is useful for making a multi-layer ceramic capacitor.

Of the additive components of the composition, $Nb_2O_5$ serves to inhibit the grain growth and thus make it possible to form fine crystal grain structure having a grain size of 2 $\mu$m to 3 $\mu$m. The $Nb_2O_5$ also functions to form a relatively fine structure. $CeO_2$ enables a sintering at a temperature of $1,270°$ C. to $1,310°$ C. It also makes it possible to form a liquid phase and thus obtain a fine structure. When contained in the composition, $MnO_2$ and CoO serve to change temperature characteristic, frequency characteristics and electrical characteristics such as insulation resistivity. On the other hand, ZnO functions to improve the flowability of liquid phase and thus obtain a fine structure.

When the additives, that is, CoO, $CeO_2$, $Nb_2O_5$, $MnO_2$ and ZnO are added to the composition, at amounts less than those described above, the insulation resistivity decreases and the loss factor (tan $\delta$) increases, even though the dielectric constant becomes high. On the other hand, amounts of the additives exceeding those described above results in a decrease in insulation resistivity and TCC characteristic beyond the X7R of EIA standard.

The present invention will be understood more readily with reference to the following examples; however these examples are intended to illustrate the invention and are not to be construed to limit the scope of the present invention.

EXAMPLE 1

First, additives, that is, $Nb_2O_5$, $MnO_2$, CoO, $CeO_2$ and ZnO all of which have a purity of 99.5% or above were prepared and weighed to obtain a composition of 1.42 weight of $Nb_2O_5$, 0.04 weight % of $MnO_2$, 0.33 weight % of CoO, 0.31 weight % of $CeO_2$ and 0.10 weight % of ZnO, as shown in the below-mentioned TABLE 1. The weighed additives were mixed together and milled in a MC Nylon jar using a milling machine, for 2 hours. The resultant additive mixture was then dried in a oven which was maintained at 100° C., for 12 hours. The dried additive mixture together with 97.80 weight % of $BaTiO_3$ was put in the above-mentioned machine and subjected to a mixing under the same condition. The resultant mixture was dried and then calcinated at 1,100° C. for 2 hours, thereby obtaining a ceramic composition according to the present invention. Following an addition of 5 weight % of 5% polyvinylacetate, the ceramic composition was molded in a disc of 10 mm in diameter and 1.5 mm in thickness by application of a pressure of 1,000 Kg/cm². The disc was then sintered at a temperature of 1,310° C., for 2 hours. Thereafter, the sintered disc was coated on its both faces with Ag electrodes and then fired at a temperature of 780° C. for 10 minutes.

The resultant product was evaluated in terms of various characteristics. The measurement of electric characteristics was performed after a lapse of 24 hours from the end of the electroding. Of the electric characteristics, the dielectric constant ($\epsilon$) and the loss factor (tan $\delta$) were measured at 25° C., 1 KHz, AC 1 V and DC bias 0 V of electric field strength, using a HP 4274A LCR meter. TCC which is the temperature characteristic representative of change rate of capacitance based on the capacitance measured at 25° C. was A measured at a temperature range of $-55°$ C. to $+125°$ C. in a constant temperature and humidity oven. The results were shown in the following TABLE 2.

EXAMPLES 2 to 6

In these examples, respective ceramic compositions were produced in the same manner as that of Example 1, except for using the contents of $Nb_2O_5$, $MnO_2$, $CoO$, $CeO_2$, $ZnO$ and $BaTiO_3$ and the sintering temperatures as shown in TABLE 1. Thereafter, the characteristics of products finally obtained from the ceramic compositions were measured in the same manner as that of Example 1. The results were shown in TABLE 2.

COMPARATIVE EXAMPLES 2 to 6

In these examples, respective ceramic compositions were also produced in the same manner as that of Example 1, except for using the contents of $Nb_2O_5$, $MnO_2$, $CoO$, $CeO_2$, $ZnO$ and $BaTiO_3$ and the sintering temperatures as shown in TABLE 1. Thereafter, the characteristics of products finally obtained from the ceramic compositions were measured in the same manner as that of Example 1. The results were shown in TABLE 2.

TABLE 2
(Dielectric Characteristics of High Dielectric Ceramic composition)

| Case | Dielectric Constant (25° C., 1 KHz) | IR ($\Omega \cdot$ cm) | tan $\delta$ (%, 1 KHz) | TCC (%) $-55°$ C. | TCC (%) $+125°$ C. |
|---|---|---|---|---|---|
| Exam. 1 | 3821 | $4.4 \times 10^{13}$ | 0.72 | $-4.3$ | $+11.8$ |
| Exam. 2 | 3773 | $4.4 \times 10^{13}$ | 0.6 | $-5.0$ | $+10.5$ |
| Exam. 3 | 3526 | $2.3 \times 10^{13}$ | 0.7 | $-7.4$ | $+7.9$ |
| Exam. 4 | 3549 | $9.2 \times 10^{13}$ | 0.55 | $-6.7$ | $+6.7$ |
| Exam. 5 | 3213 | $1.1 \times 10^{13}$ | 0.57 | $-7.2$ | $+6.8$ |
| Exam. 6 | 3258 | $4.3 \times 10^{13}$ | 0.51 | $-7.7$ | $+7.8$ |
| Comp. 1 | 3814 | $6.0 \times 10^{13}$ | 0.92 | $-1.9$ | $+16.75$ |
| Comp. 2 | 3817 | $1.7 \times 10^{13}$ | 0.78 | $-2.5$ | $+15.2$ |
| Comp. 3 | 3149 | $7.2 \times 10^{13}$ | 0.50 | $-15.7$ | $+6.7$ |
| Comp. 4 | 3244 | $8.0 \times 10^{13}$ | 0.48 | $-18.4$ | $+7.5$ |

In cases of Comparative Example 1 and 2, the total contents of additives, that is $Nb_2O_5$, $MnO_2$, $CoO$, $CeO_2$ and $ZnO$ were 1.92 weight % and 2.06 weight %, respectively. These total contents which were less than 2.57 weight % of Example 3 by rates of 25 percents and 20 percents, respectively, resulted in a great decrease in insulation resistivity and TCC at $+125°$ C. beyond the characteristic of X7R of EIA standard, which the X7R characteristic corresponds to TCC ranging $\pm 15\%$, even though making the dielectric constant stable and high. In Comparative Example 3 and 4, the total contents of $Nb_2O_5$, $MnO_2$, $COO$, $CeO_2$ and $ZnO$ were 3.80 weight % and 3.22 weight respectively. These total contents which were more than that of Example 3 by rates of 20 percents and 25 percents, respectively, resulted in TCC at $+125°$ C. beyond the characteristic of X7R of EIA standard. On the other hand, Examples 1, 2, 4, 5 and 6 each having a total content of additives ranging from 2.2 weight % to 2.96 weight % were more than or less than the total content of Example 3 by rates within 15 percents. In these cases, all the measured TCC characteristics satisfied the characteristic of X7R of EIA standard. They also exhibited high dielectric constants of 3,200 to 3,800 and high insulation resistivities of 10 to $10^{14}$. As a result, it were confirmed that superior dielectric ceramic composition were obtained in accordance with the present invention. These dielectric ceramic compositions were useful for making miniature capacitors, thereby contributing to a compactness of electronic/electric appliances and to saving in manufacture cost.

What is claimed is:
1. A ceramic composition having a high dielectric constant, said ceramic composition essentially consisting of 97.04 weight % to 97.80 weight % of $BaTiO_3$ as a host material, 1.42 weight % to 1.92 weight % of $Nb_2O_5$, 0.04 weight % to 0.06 weight % of $MnO_2$, 0.33 weight % to 0.45 weight % of $CoO$, 0.31 weight % to 0.41 weight % of $CeO_2$ and 0.10 weight % to 0.12 weight % of $ZnO$.

* * * * *

TABLE 1
(High Dielectric Ceramic composition)

| Case | Composition (wt %) BaTiO₃ | CoO | CeO₃ | Nb₂O₅ | MnO₂ | ZnO₂ | Sintering Temp. (°C.) |
|---|---|---|---|---|---|---|---|
| Exam. 1 | 97.80 | 0.33 | 0.31 | 1.42 | 0.04 | 0.1 | 1310 |
| Exam. 2 | 97.68 | 0.35 | 0.32 | 1.50 | 0.05 | 0.1 | 1270 |
| Exam. 3 | 97.43 | 0.39 | 0.36 | 1.67 | 0.05 | 0.1 | 1330 |
| Exam. 4 | 97.30 | 0.41 | 0.38 | 1.75 | 0.05 | 0.11 | 1270 |
| Exam. 5 | 97.16 | 0.43 | 0.40 | 1.84 | 0.06 | 0.11 | 1310 |
| Exam. 6 | 97.04 | 0.45 | 0.41 | 1.92 | 0.06 | 0.12 | 1290 |
| Comp. 1 | 98.08 | 0.29 | 0.27 | 1.25 | 0.04 | 0.07 | 1290 |
| Comp. 2 | 97.94 | 0.31 | 0.29 | 1.34 | 0.04 | 0.08 | 1310 |
| Comp. 3 | 96.92 | 0.47 | 0.43 | 2.0 | 0.06 | 0.12 | 1330 |
| Comp. 4 | 96.78 | 0.49 | 0.45 | 2.09 | 0.06 | 0.13 | 1310 |